(12) United States Patent
Chen

(10) Patent No.: US 6,819,456 B1
(45) Date of Patent: Nov. 16, 2004

(54) SCANNER PROVIDED WITH MOVABLE PLANAR LIGHT SOURCE

(75) Inventor: Chih-Ming Chen, Yung-Her (TW)

(73) Assignee: BENQ Corporation, Taoyuan (TW)

( * ) Notice: Subject to any disclaimer, the term of this patent is extended or adjusted under 35 U.S.C. 154(b) by 0 days.

(21) Appl. No.: 09/368,610

(22) Filed: Aug. 5, 1999

(30) Foreign Application Priority Data

Dec. 14, 1998 (TW) .................................. 87220808 U

(51) Int. Cl.$^7$ .............................................. H04N 2/04
(52) U.S. Cl. ...................... 358/474; 358/475; 358/509; 358/496; 358/497
(58) Field of Search ................................ 358/474, 475, 358/461, 509, 494, 487, 496, 497; 355/67

(56) References Cited

U.S. PATENT DOCUMENTS

| | | | |
|---|---|---|---|
| 4,750,003 A | 6/1988 | Terashima et al. | 346/74.2 |
| 4,982,235 A * | 1/1991 | Fujino | 355/235 |
| 4,989,099 A * | 1/1991 | Koshiyouji et al. | 358/474 |
| 5,038,227 A * | 8/1991 | Koshiyouji | 358/474 |
| 5,126,839 A * | 6/1992 | Sugiura | 358/80 |
| 5,367,382 A | 11/1994 | Bhatt et al. | 358/403 |
| 5,781,311 A * | 7/1998 | Inoue | 358/475 |
| 6,081,630 A | 6/2000 | Kaneko | 382/313 |

FOREIGN PATENT DOCUMENTS

JP          04-261261          9/1992

OTHER PUBLICATIONS

Abstract of JP 04–261261, Patent Abstracts of Japan, (2000).
U.S. patent application Ser. No. 09/427,111, Chen, filed Oct. 1999.

* cited by examiner

Primary Examiner—Kimberly Williams
Assistant Examiner—Negussie Worku
(74) Attorney, Agent, or Firm—Ladas & Parry LLP

(57) ABSTRACT

An image scanner comprising an image pick-up device and a planar light source. Backlight is generated by the planar light source and transmitted through a object. The image of the object is focused on the image pick-up device. In scanning operations, the planar light source and the image pick-up device are synchronously moved to scan the object.

12 Claims, 4 Drawing Sheets

SCANNER PROVIDED WITH MOVABLE PLANAR LIGHT SOURCE

BACKGROUND OF THE INVENTION

1. Field of the Invention

The present invention relates in general to an image scanner of low manufacturing cost and high scanning quality.

2. Description of the Related Art

Generally speaking, flat bed type image scanners are classified into two different kinds in accordance with their different operation ways: reflection-type scanners and transmission-type scanners. The reflection-type scanners are used for scanning non-transparent media such as paper, objects and books. On the other hand, the transmission-type scanners are used for scanning transparent media such as films and slides.

The present invention is related to the transmission-type scanners. Conventional transmission-type scanners include two kinds of light sources: movable and fixed. FIG. 1 is a schematic diagram of a conventional transmission-type scanner provided with a movable light source, wherein a tubular lamp 11 and an optical module 14 are simultaneously moved to scan a transparent object 12 disposed on a piece of glass 13. The image of the transparent object 12 is focused on a charge-coupled device (CCD) 15 contained in the optical module 14. Such a scanner can be put into practice in various ways. For example, what is disclosed in Taiwanese Patent No. 311791.

In the above example, the distribution of intensity of illumination of the tubular lamp 11 is very concentrated, as shown in FIG. 2. If at any moment the movement of the optical module 14 and that of the tubular lamp 11 are not simultaneous, then the light received by the charge-coupled device 15 will be greatly reduced. Thus, the resultant image signal obtained from the charge-coupled device 15 is poor. Therefore, the movement of the optical module 14 and that of the tubular lamp 11 should be always kept simultaneous during the scanning process. However, the tubular lamp 11 and the optical module 14 generally are driven by different mechanisms so that keeping the tubular lamp 11 and the optical module 14 simultaneous is pretty complicated and difficult.

FIG. 3 depicts a conventional scanner provided with a fixed light source, where the light source is a planar light source 31 disclosed in, for example, Taiwanese Patent No. 292032. The planar light source 31 includes two tubular lamps 311, a reflection sheet 315, a lighting guide 317 and a diffuser 316. The reflection sheet 315 is provided on the top of the planar light source 31 to reflect the light of the tubular lamps 311. The lighting guide 317 is used to uniformly distribute the light reflected by the reflection sheet 315 via a plurality of light-guiding dots 318 provided thereon. The diffuser 316 is also utilized to uniformly distribute the light reflected by the reflection sheet 315. Both the lighting guide 317 and the diffuser 316 are of great size. In operations, the planar light source 31 is stationary while an optical module 34 is moved to scan a transparent object 32 disposed on a piece of glass 33. The image of the object 32 is focused on a charge-coupled device (CCD) 35 contained in the optical module 34.

Due to the use of the reflection sheet 315, diffuser 316 and lighting guide 317, the distribution of intensity in this example is much more uniform than that of the previous example. Nevertheless, the intensity difference between the middle and sides of the planar light source is 5%–10% that does not satisfy the requirement for a scanner of high revolution. In addition, forming light-guiding dots 318 on the lighting guide 317 is labor consuming. The greater size of the lighting guide 317 is, the more light-guiding dots 318 are required; thus, the manufacture of lighting guides is difficult and expensive.

SUMMARY OF THE INVENTION

An object of the present invention is to provide a scanner that solves the above-mentioned problems.

In accordance with the object of the present invention, an image scanner comprising an image pick-up device and a planar light source is provided. Backlight is generated by the planar light source to transmit through a transparent object. The image pick-up device is used to retrieve the image of the transparent object, i.e., the image of the transparent object is focused on the image pick-up device. In scanning operations, the planar light source and the image pick-up device are simultaneously moved to scan the transparent object.

As described above, the planar light source of the present invention is moved to project backlight onto the simultaneously moving image pick-up device. Accordingly, the size of the planar light source can be small. A lighting guide in the planar light source is also of small size and has fewer light-guiding dots provided thereon; thus, manufacture of the lighting guide of the present invention is easier than that of the prior art. In addition, the distribution of light intensity in the present invention employing the small lighting guide is more uniform than that in the prior art employing the large lighting guide. The difference between the illumination on the middle of the transparent object and the illumination on the sides of the transparent object is less than 1% in the present invention, that is superior to 5%–10% in the prior art. Therefore, the scanning quality of the present invention is superior to that of the prior art.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
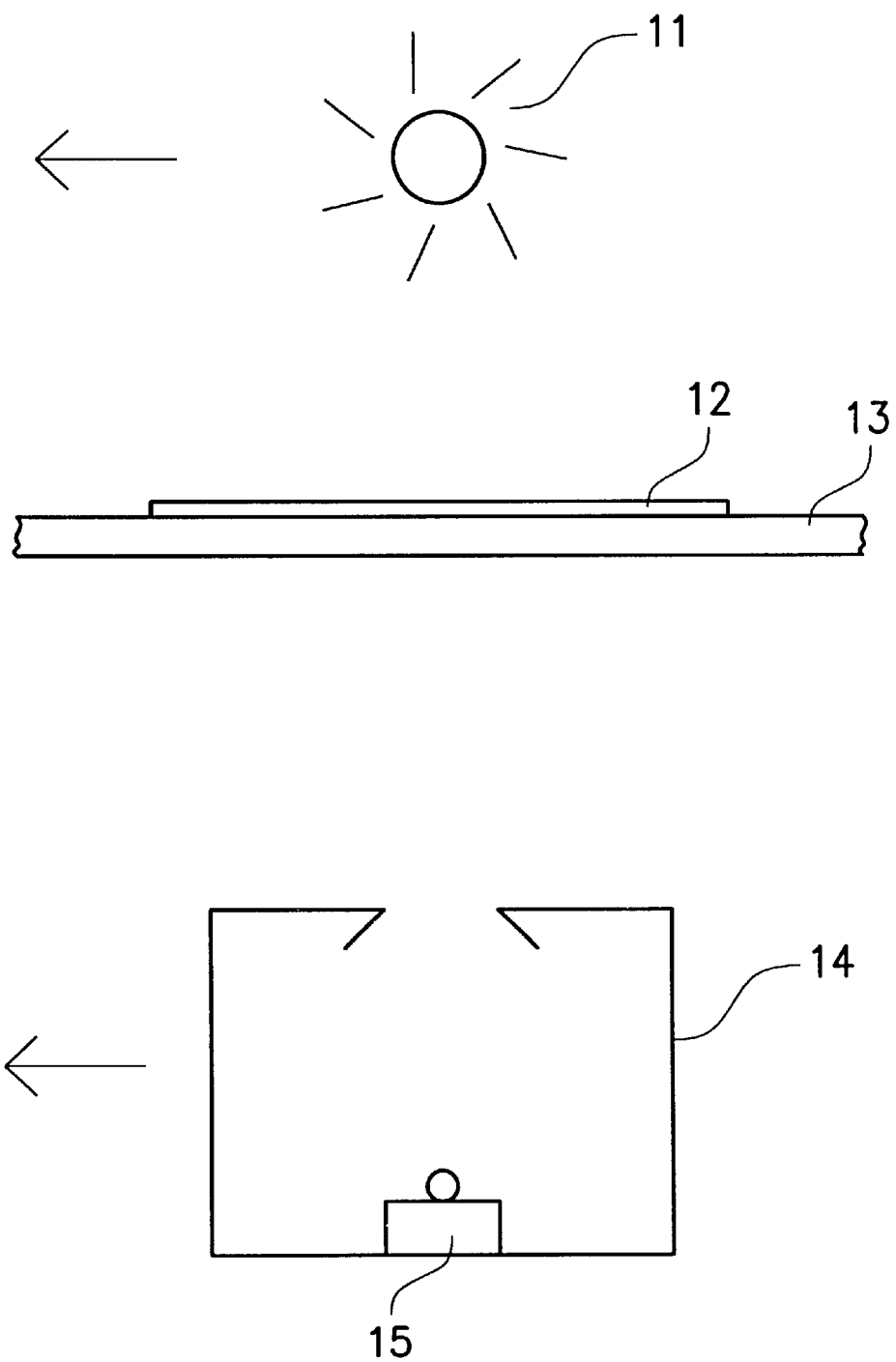
FIG. 1 depicts a conventional image scanner provided with a movable light source.
Figure 2:
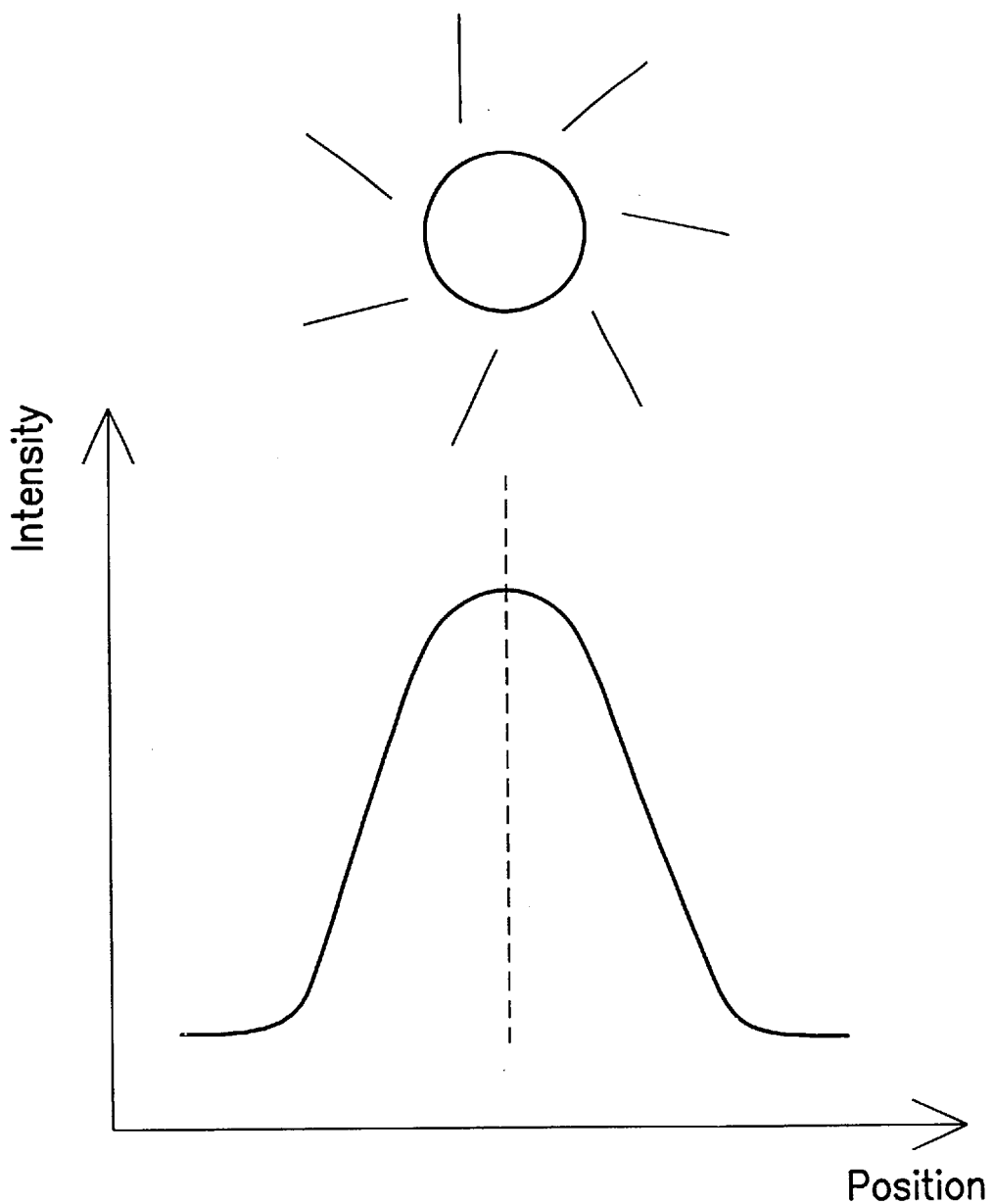
FIG. 2 shows the distribution of intensity of illumination of a tubular lamp.
Figure 3:
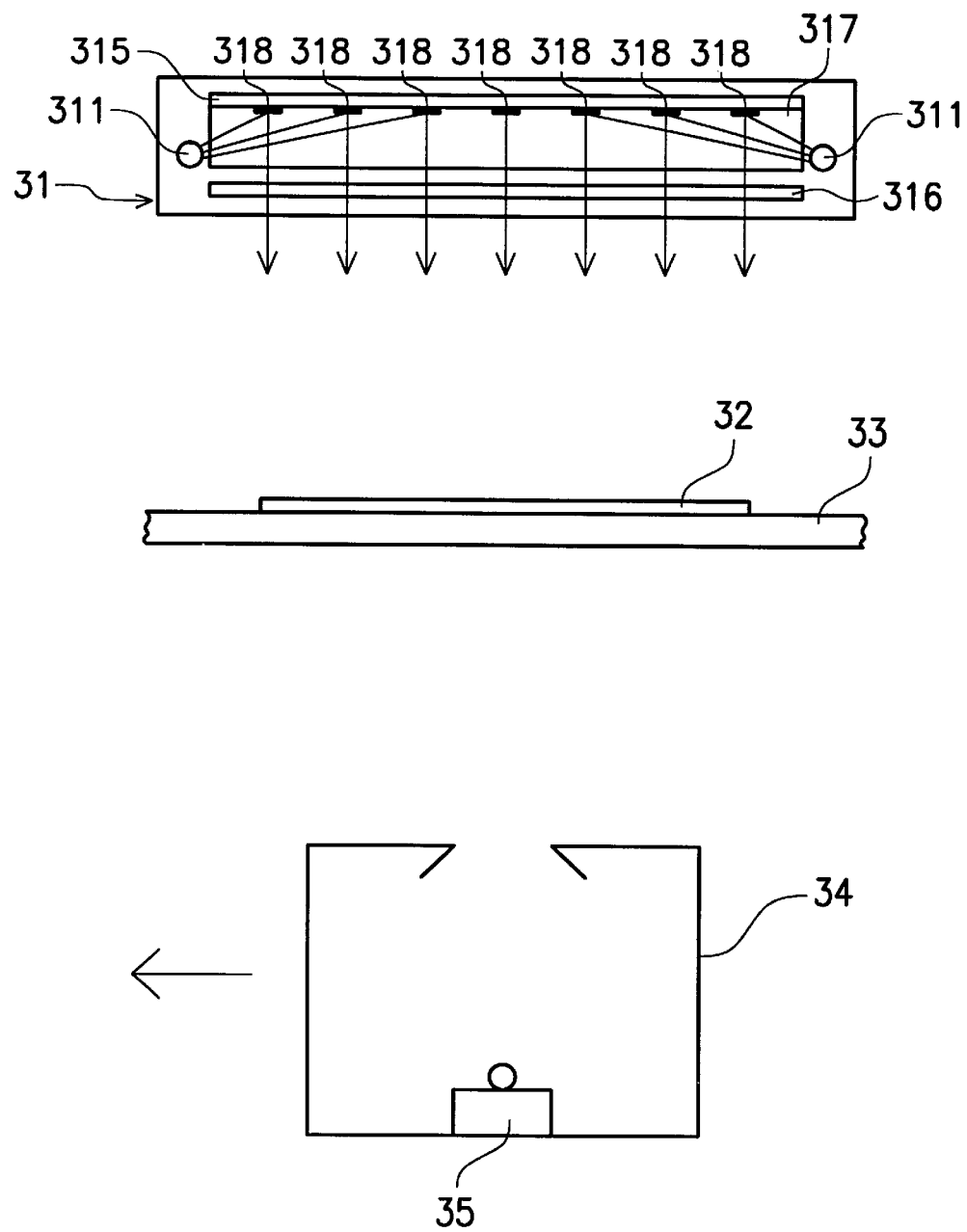
FIG. 3 depicts a conventional image scanner provided with a fixed light source.
Figure 4:
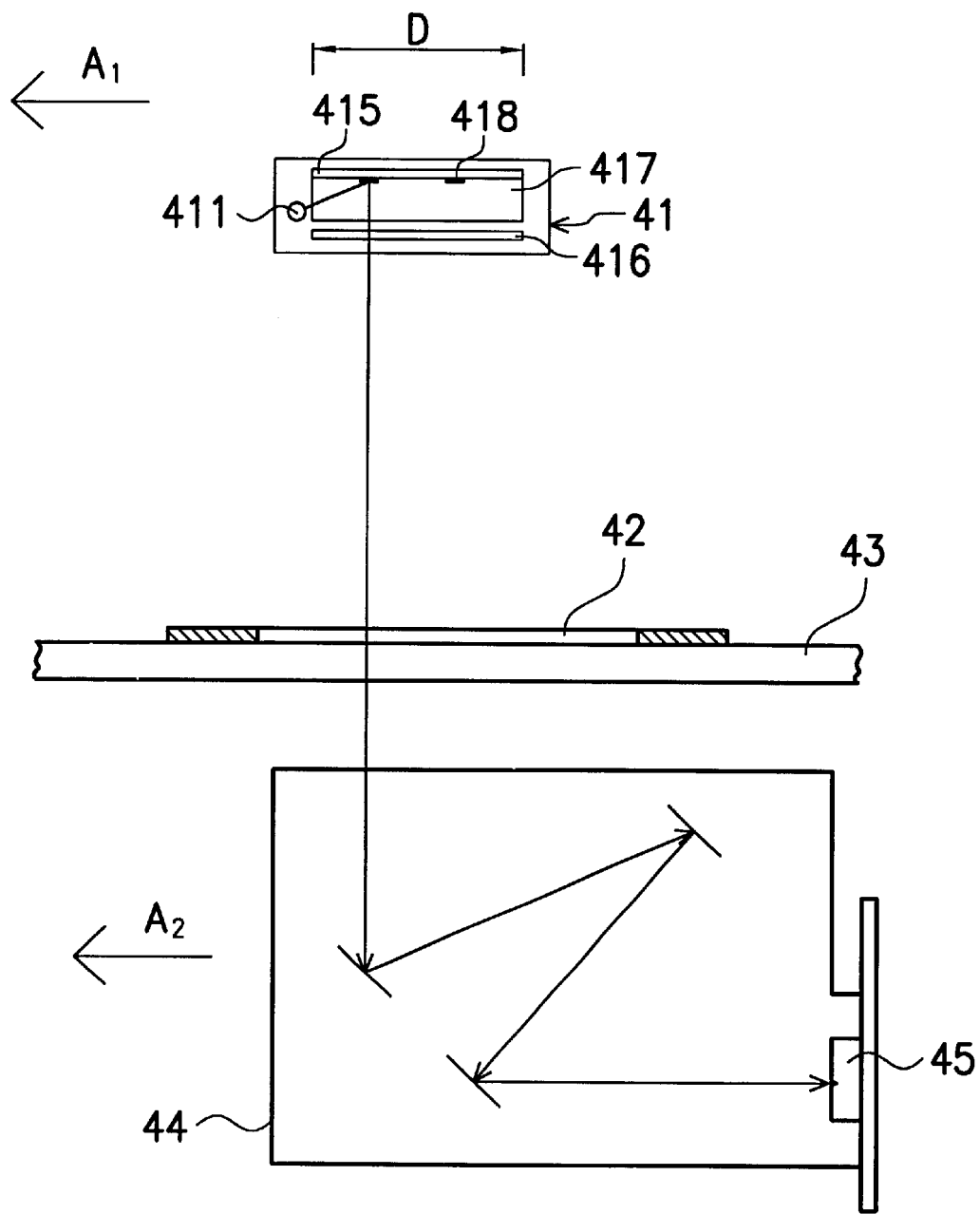
FIG. 4 depicts an image scanner provided with a movable planar light source in accordance with the present invention.

FIG. 4 depicts an image scanner provided with a movable planar light source 41 in accordance with the present invention, wherein the planar light source 41 includes a tubular lamp 411, a reflection sheet 415, a lighting guide 417 and a diffuser 416. The dimension of the planar light source 41 along the longitudinal axis of the image scanner is D (in FIG. 4, the direction of the longitudinal axis is indicated by arrows A1, A2). The reflection sheet 415 is utilized to reflect light of the tubular lamp 411. The lighting guide 417 is utilized to uniformly distribute the light from the reflection sheet 415 via a plurality of lighting-guide dots 418 provided thereon. The diffuser 416 is also used to uniformly distribute the light. In the present invention, the lighting guide 417 and the diffuser 416 are of small dimension D. During the scanning operations, both the planar light source 41 and an image pick-up device 44 should simultaneously move in same speed toward same direction to scan the transparent object 42 disposed on the glass 43. The image of the object 42 is focused on a charge-coupled device (CCD) 45 disposed in the image pick-up device 44.

During the scanning operation toward the transparent object, the image pick-up device 44 and the planar light source 41 should simultaneously move in the same direction with same speed. The planar light source 41 projects light transmitting through the object 42 and finally received by the moving image pick-up device 44. Accordingly, the size of the planar light source 41 is unnecessary to cover the whole object 42 and the planar light source 41 can be in the small dimension D. However, due to the moving speed mismatch between the image pick-up device 44 and the planar light source 41; there is a maximum relative position difference between the image pick-up device 44 and the planar light source 41 during the scanning operation. In order to keep the light always uniformly distributed toward the transparent object, we must make the dimension D larger then the relative position difference. To sum up, the minimum dimension D must be larger than the possible maximum relative position difference between the image pick-up device 44 and the planar light source 41. The lighting guide 417 in the planar light source 41 is also of small dimension D and has some light-guiding dots 418 provided thereon; thus, the manufacturing of the lighting guide of the present invention is easier than that of the prior art. In addition, the distribution of light intensity in the present invention employing the small lighting guide is more uniform than that in the prior art employing the large lighting guide. The difference between the illumination on the middle of the object 42 and the illumination on the sides of the object 42 is less than 1% in the present invention, that is superior to the 5%–10% in the prior art. Therefore, the scanning quality of the present invention is superior to that of the prior art.

Furthermore, the planar light source 41 of the present invention needs only one tubular lamp 411 as the light source due to the use of the small lighting guide 417. That is more economical than the use of two tubular lamps in the prior art.

The above embodiment introduces how the arrangement of the present invention is applied to a transmission-type scanner. However, it should be understood that the present invention is also applicable to the image scanner disclosed in U.S. Pat. No. 5,467,172, which can be selectively used in a transmission-type operation or a reflection-type operation. That is, the arrangement of the present invention is applicable to the scanner disclosed in U.S. Pat. No. 5,467,172 to scan transparent media during the transmission-type operation.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image scanner for scanning a transparent object, comprising:

an image pick-up device to retrieve an image of the transparent object; and a planar light source for uniformly distributing light, which is transmitted through at least a portion of the transparent object and received by the image pick-up device, the planar light source comprising:

a lamp;

a lighting guide disposed adjacent to the lamp;

a reflective sheet disposed above the lighting guide;

a diffuser disposed below the lighting guide, wherein the planar light source and the image pick-up device are simultaneously moved along a longitudinal axis of the image scanner to scan the transparent object.

2. An image scanner as claimed in claim 1, wherein the scanner further comprises a piece of glass on which the transparent object is disposed, the glass being disposed below the diffuser.

3. An image scanner as claimed in claim 2, wherein the image pick-up device and the light source are arranged on opposite sides of the piece of glass.

4. An image scanner for scanning a transparent object, comprising:

an image pick-up device to retrieve an image of the transparent object; and a planar light source for generating a substantially uniform planar light which is transmitted through the transparent object and received by the image pick-up device, the planar light source having a dimension of D along a longitudinal axis of the image scanner, wherein the image pick-up device and the uniform planar light source are simultaneously moved along the longitudinal axis of the image scanner when performing scanning operation, and the maximum relative position difference between the image pick-up device and the planar light source during the scanning operation is less than the dimension D.

5. An image scanner as claimed in claim 4, wherein the planar light source comprises:

a lamp;

a lighting guide disposed adjacent to the lamp;

a reflective sheet disposed above the lighting guide; and a diffuser disposed below the lighting guide.

6. An image scanner as claimed in claim 5, wherein the scanner further comprises a piece of glass on which the transparent object is disposed, the glass being disposed below the diffuser.

7. An image scanner as claimed in claim 6, wherein the image pick-up device and the light source are arranged on opposite sides of the piece of glass.

8. A method for scanning a transparent object comprising the steps of:

transmitting uniformly distributed light from a planar light source through at least a portion of the transparent object;

retrieving an image of the transparent object by receiving the transmitted light at an image pick-up device; and simultaneously moving the planar light source and the image pick-up device to scan the transparent object.

9. A method as claimed in claim 8, wherein the planar light source comprises:

a lamp;

a lighting guide disposed adjacent to the lamp;

a reflective sheet disposed above the lighting guide; and a diffuser disposed below the lighting guide.

10. A method as claimed in claim 9, wherein the transparent object is disposed on a piece of glass, the glass being disposed below the diffuser.

11. A method as claimed in claim 10, wherein the image pick-up device and the light source are arranged on opposite sides of the piece of glass.

12. A method as claimed in claim 8, wherein the planar light source has a dimension of D, and wherein the maximum relative position difference between the image pick-up device and the planar light source during scanning is less than the dimension D.

* * * * *